US006983172B2

(12) United States Patent
Harrison

(10) Patent No.: US 6,983,172 B2
(45) Date of Patent: Jan. 3, 2006

(54) METHOD AND APPARATUS FOR TRANSMITTING A TRAFFIC SIGNAL USING AN ADAPTIVE ANTENNA ARRAY

(75) Inventor: R. Mark Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 504 days.

(21) Appl. No.: 10/037,945

(22) Filed: Jan. 3, 2002

(65) Prior Publication Data

US 2003/0125002 A1    Jul. 3, 2003

(51) Int. Cl.
H04B 1/00 (2006.01)
H04B 1/38 (2006.01)
H04B 1/10 (2006.01)

(52) U.S. Cl. .................. 455/561; 455/562.1; 455/65; 455/63.4; 455/67.16; 455/276.1; 375/349

(58) Field of Classification Search ............... 455/561, 455/562.1, 501, 504, 506, 63.1, 63.4, 65, 455/67.16, 114.2, 121, 132–137, 134, 135, 455/226.1–226.7, 272, 276.1, 296, 334; 375/267, 375/295, 347–349, 219, 358, 229, 232, 221; 342/367, 368, 373, 378, 341, 296

See application file for complete search history.

(56) References Cited

U.S. PATENT DOCUMENTS 6,067,324 A    5/2000  Harrison
6,087,986 A *  7/2000  Shoki et al. ................. 342/383
6,121,927 A *  9/2000  Kalliojarvi ................... 342/453
6,188,913 B1 * 2/2001  Fukagawa et al. ........ 455/562.1
6,192,256 B1 * 2/2001  Whinnett .................. 455/562.1
6,233,466 B1 * 5/2001  Wong et al. .............. 455/562.1
6,317,586 B1 * 11/2001 Haardt ..................... 455/67.16
6,345,188 B1 * 2/2002  Keskitalo et al. ........... 455/561

\* cited by examiner

Primary Examiner—Duc M. Nguyen
(74) Attorney, Agent, or Firm—Ingrassia Fisher & Lorenz, P.C.

(57) ABSTRACT

A method (100) is provided for transmitting a traffic signal with an adaptive antenna array of a base transceiver such that a subscriber unit utilizes a non-dedicated pilot transmitted from a reference antenna element for demodulation of the traffic signal. The method (100) comprises determining a channel impulse response from a plurality of antenna elements in operative communication with the base transceiver to a receive antenna of the subscriber unit (102). In addition, the method (100) comprises computing an array weight vector that is at least a function of a reference channel impulse response of one of said plurality of antenna elements configured as a reference antenna element and the channel impulse response of one of the plurality of antenna elements that is an element of the adaptive antenna array (104), configuring the adaptive antenna array with the adaptive array weight vector (108) and transmitting the traffic signal with the adaptive antenna array configured with the adaptive array weight vector (110).

32 Claims, 6 Drawing Sheets

METHOD AND APPARATUS FOR TRANSMITTING A TRAFFIC SIGNAL USING AN ADAPTIVE ANTENNA ARRAY

FIELD OF THE INVENTION

The present invention generally relates to a wireless communication system, and more particularly to a method and apparatus for transmitting a traffic signal using an adaptive antenna array in a wireless communication system.

BACKGROUND OF THE INVENTION

A frequent goal in designing wireless communications systems is to increase the number of users that may be simultaneously served by the communications system. This is generally referred to as increasing system capacity. In multiple access communications systems, including code division multiple access (CDMA) wireless communications systems, the use of an adaptive antenna array at the base transceiver has been proposed for increasing system capacity.

An adaptive antenna array includes two or more radiating elements with dimensions, spacing, orientation, and illumination sequences that produce a field pattern on a per-user basis from a combination of fields emitted from individual elements that has greater field intensities in some directions and lesser field intensities in other directions. A base transceiver that adjusts field patterns of an adaptive antenna array on a per-user basis typically uses per-user pilots to fulfill the requirement that the pilot and traffic channel must be substantially in-phase for proper demodulation of the traffic channel. However, utilization of per-user pilots increases complexity and diminishes capacity of the communication system.

For example, per-user pilots dictate longer pilot sequences to accommodate a greater number of pilots, and there is a corresponding increase in complexity of the pilot searcher due to the longer pilot sequences, including increases in computational requirements. In addition, soft handoff complexity is increased with the use of per-user pilots and capacity is reduced with the assignment of an additional per-user pilot during a soft handoff. Furthermore, additional pilots increase power requirements for each traffic channel, thereby reducing the amount of gain obtained with an adaptive antenna array.

In view of the foregoing, is should be appreciated that it would be desirable to provide methods and apparatus for transmitting a traffic channel with an adaptive antenna array without per-user pilots. Furthermore, additional desirable features will become apparent to one skilled in the art from the following detailed description of a preferred exemplary embodiment and appended claims.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

The following detailed description of a preferred exemplary embodiment is merely exemplary in nature and is not intended to limit the invention or the application and use of the invention.

Figure 1:
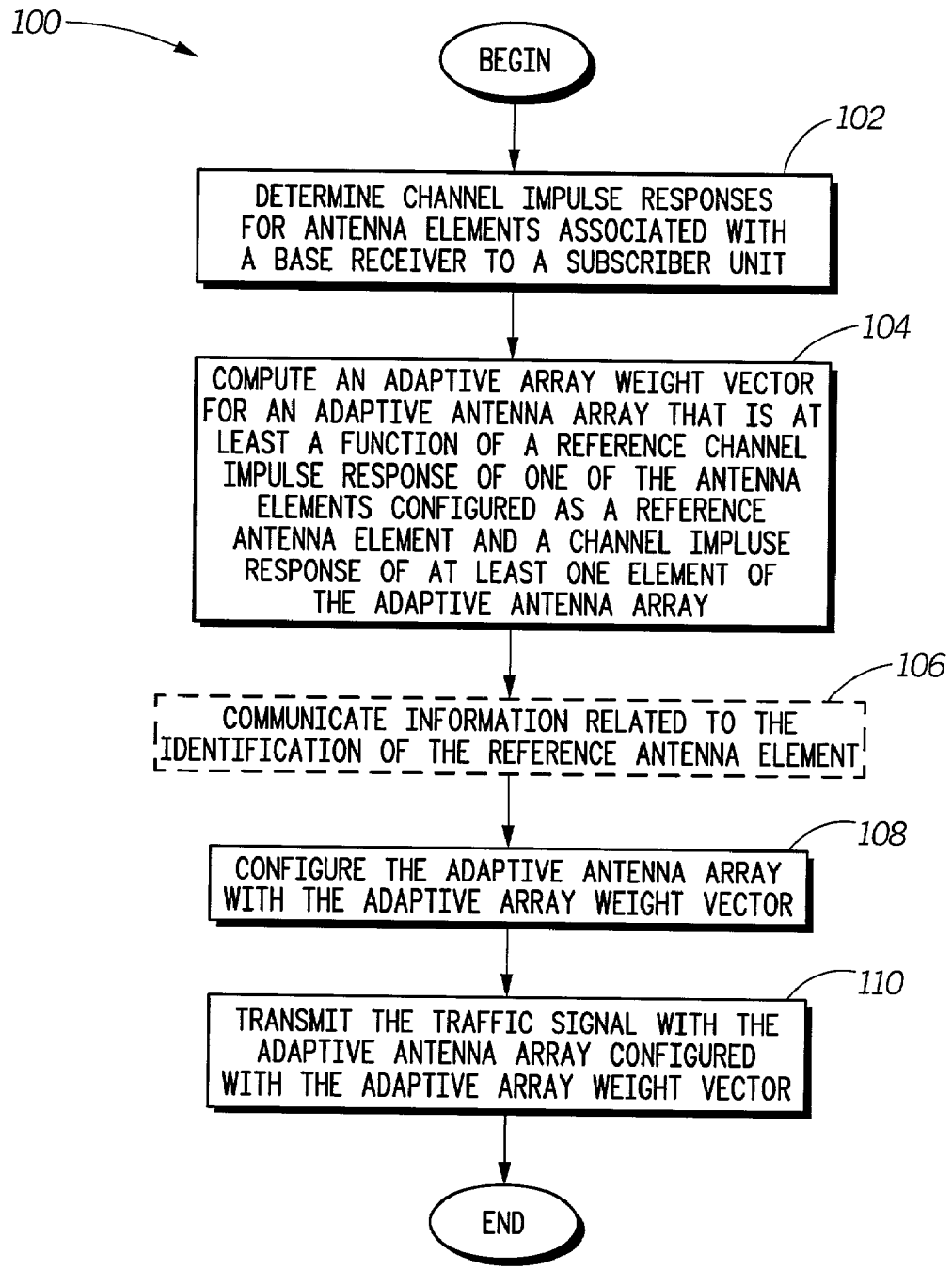
FIG. 1 is a method for transmitting a traffic signal from an adaptive antenna array such that a subscriber unit utilizes a non-dedicated pilot transmitted from a reference antenna element for demodulation of the traffic signal according to a preferred exemplary embodiment of the present invention.

FIG. 1 illustrates a method 100 for transmitting a traffic signal from an adaptive antenna array such that a subscriber unit utilizes a non-dedicated pilot transmitted from a reference antenna element for demodulation of the traffic signal. The method 100 begins with a determination of channel impulse responses from antenna elements associated with a base transceiver to a subscriber unit 102. The antenna elements associated with the base transceiver can be an antenna element of the adaptive antenna array or an antenna element at or near the location of the base transceiver that is in operative communication with the base transceiver.

The method 100 preferably determines one channel impulse response from an antenna element of the adaptive antenna array to the subscriber unit, more preferably determines a channel impulse response from more than one antenna element of the adaptive antenna array to the subscriber unit and most preferably determines a channel impulse response for substantially all antenna elements of the adaptive antenna array to the subscriber unit. The channel impulse responses can be determined with any number of techniques, including transmission of an element pilot from an antenna element to the subscriber unit and estimation of the channel impulse response by the subscriber unit based upon the transmission of the element pilot, for example. Once the channel impulse responses from antenna elements associated with the base transceiver to the subscriber unit are determined 102, the method 100 computes an adaptive array weight vector for the adaptive antenna array that is at least a function of a reference channel impulse response of one of the antenna elements configured as a reference antenna element and a channel impulse response from at least one antenna element of the adaptive antenna array 104.

The adaptive array weight vector is preferably computed to maximize the Signal to Interference plus Noise Ratio (SINR) at the subscriber unit and to enable the subscriber unit to use the reference channel impulse response from the reference antenna element to the subscriber unit as a demodulation reference. This can be expressed in two parts: maximizing the traffic signal power received by the subscriber unit ($p_d$), and minimizing the phase error on the traffic channel. While any number of base transceivers can be utilized in accordance with the present invention, a multi-path combining transceiver is used in the preferred exemplary embodiment, such as a RAKE receiver that is commonly used in CDMA communication systems. (See Proakis, "Digital Communications," Second Edition, pp. 729–739, McGraw-Hill publishing, 1989, which is hereby incorporated by reference.) Therefore, the signal (r) received at the subscriber unit and measured at the combiner output of the subscriber unit during a single symbol time can be expressed as:

$$r = bv^H Hw + n \quad (1)$$

Where: b is a complex scalar of the traffic channel symbol; $v^H$ is the complex conjugate transpose of v, which is an M element column vector containing the multi-path combining weights of the multi-path receiver; H is a matrix with M rows and N columns containing the channel impulse response determined from an element of the adaptive antenna array to an antenna element of the subscriber unit; w is the adaptive array weight vector, which is an N element column vector; and n is the M-by-1 column vector of noise samples with one element for each multi-path tap on each receive antenna.

The dimensions of the vectors of equation (1) are based upon the number of receive paths (M) (i.e., the number of taps (M) in the channel impulse response for the antennas of the base transceiver) and the number of transmit coefficients (N). It is preferable to use the same number of taps for each antenna, so the total number of taps over substantially all receive antennas (M) is:

$$M = KL \quad (2)$$

Where: L is the number of receive antennas and K is the number of taps to characterize the channel impulse response. While the preferred exemplary embodiment of the present invention will utilize a single receive antenna (i.e., L=1), any number of receive antenna can be used in accordance with the present invention. Furthermore, a non-frequency selective adaptive antenna array will be utilized in the preferred exemplary embodiment of the present invention, so there is one coefficient per transmit antenna element and the number of transmit coefficients (N) is the number of antenna elements. However, a frequency selective adaptive antenna array can be used in accordance with the present invention, in which case the number of transmit coefficients (N) is greater than the number of elements.

The dependence of the multi-path combining weights (v) of the multi-path receiver on the reference element impulse response can be appreciated by considering the RAKE receiver. The column vector containing the multi-path combining weights (v) of the RAKE receiver can be expressed as:

$$v = \Sigma^{-1} h \quad (3)$$

Where: h is an M-by-1 column vector containing the reference element impulse response, which is one of the columns of the matrix with M rows and N columns containing the channel impulse response measured from an element of the adaptive antenna array to an antenna element of the subscriber unit (H) if the reference antenna element is an antenna element of the adaptive antenna array; and $\Sigma^{-1}$ is the inverse of the noise autocorrelation matrix ($\Sigma$), which can be expressed as:

$$\Sigma = E\{nn^H\} \quad (4)$$

Where $E\{x\}$ is the expected value of the variable x.

The assumption is typically made for a RAKE receiver that the noise is uncorrelated, therefore the noise autocorrelation matrix ($\Sigma$) is a diagonal matrix containing the noise power on each path along the diagonal, and zeros elsewhere. If the channel is a flat fading channel, the subscriber unit has one antenna (i.e., M=1) and the M element column vector containing the multi-path combining weights (v) is a scalar, the complex conjugate transpose of the multi-path combining weights ($v^H$) does not combine multiple paths, but sets the receive signal phase to be opposite to that of the M-by-1 column vector containing the reference element impulse response (h) in order to correct phase offsets induced by the channel. Therefore, the present invention is applicable to both multi-path and in flat fading channels.

If the assumption is made that the traffic channel signal has unity power at the antenna output, the traffic signal power received by the subscriber unit ($p_d$) at the combiner output can be expressed as:

$$p_d = |v^H Hw|^2 \quad (5)$$

Where $|x|^2$ is the absolute value squared of the scalar x.

As previously provided in this detailed description of a preferred exemplary embodiment, the traffic signal power received by the subscriber unit ($p_d$) is preferably maximized in accordance with the present invention. Therefore, the adaptive array weight vector (w) is selected so that the received signal from the adaptive antenna array is matched to the M element column vector containing the multi-path combining weights (v) of the multi-path receiver after passing through the channel represented by the M rows and N columns containing the channel impulse response measure from an element of the antenna array to an antenna element of the subscriber unit (H). That is, the adaptive array weight vector (w) is selected to satisfy the following:

$$w = H^H v / \|H^H v\|_2 \quad (6)$$

Where $\|x\|_2$ is the 2-norm of a vector x.

In addition to maximizing the traffic signal power received by the subscriber unit ($p_d$), the phase error of the traffic signal is preferably minimized to reduce significant perturbations in the phase of the traffic signal. In order to minimize the phase error of the traffic signal, a phase correction factor ($\Delta$) is selected to reduce the phase errors from the received traffic signal at the multi-path combiner output as follows:

$$\Delta = (v^H Hw)^* / |v^H Hw| \quad (7)$$

Where $x^*$ is the complex conjugate of the variable x. Since the adaptive array weight vector (w) is selected to satisfy equation (6) in this preferred exemplary embodiment of the present invention, the phase correction factor ($\Delta$) can be expressed as follows:

$$\Delta = \frac{v^H H(H^H v / \|H^H v\|_2)}{|v^H H(H^H v / \|H^H v\|_2)|} = \frac{\|v^H H\|_2^2 / \|H^H v\|_2}{\|v^H H\|_2^2 / \|H^H v\|_2} = 1 \quad (8)$$

As shown in equation (8), the phase correction factor ($\Delta$) is unity and the traffic channel phase is relatively undisturbed in relation to the transmission through the adaptive array by the reference element with the particular adaptive array weight vector (w). Therefore, the subscriber unit can use the reference channel impulse response (h) of the reference antenna element to compute the multi-path combiner weights (v) without knowledge of other impulse responses.

As can be appreciated, limited amounts of phase error will not overly degrade the receiver performance. In fact, since channel estimates are generally imperfect, it is difficult to determine exact values of the phase correction factor ($\Delta$). Therefore, an adaptive array weight vector (w) that is sufficiently close to those produced by equation (6) can be used as long as the adaptive array weight vector does not cause a value of the phase correction factor ($\Delta$) that is large enough to substantially degrade the receiver performance.

The traffic signal power received by the subscriber unit ($p_d$) can be increased for a given channel with the selection of a reference antenna element. In view of this ability to increase the traffic signal power received by the subscriber unit ($p_d$) with the selection of a reference antenna element, the computation of an adaptive array weight vector (w) for the adaptive antenna array that is at least a function of the reference channel impulse response of one of the antenna elements configured as a reference antenna element and a channel impulse response from at least one antenna element of the adaptive antenna array 104 preferably selects the reference antenna element based upon a comparison of the traffic signal power received by the subscriber ($p_d$) with difference antenna elements configured as the reference antenna element. Preferably, the reference antenna element is selected that provides an increase in traffic signal power received by the subscriber unit ($p_d$) as compared to another antenna element that is available as the reference antenna element, more preferably selects the reference antenna element that provides an increase in traffic signal power received by the subscriber unit ($p_d$) as compared to a majority of antenna elements that are available as the reference antenna element, and most preferably selects the reference antenna element that provides an increase in traffic signal power received by the subscriber unit ($p_d$) as compared to substantially all of antenna elements that are available as the reference antenna element (i.e., maximizes the traffic signal power received by the subscriber unit ($p_d$)). The selection of the reference element can be accomplished with any number of methods. In addition, the impulse responses for antenna elements are preferably used as the reference channel impulse response (h) to determine a traffic signal power received by the subscriber unit ($p_d$) with equation (5), and the antenna element associated with the impulse response that provides an increase in the traffic signal power received by the subscriber unit ($p_d$) as compared to another antenna elements is selected as the reference antenna elements.

Figure 2:
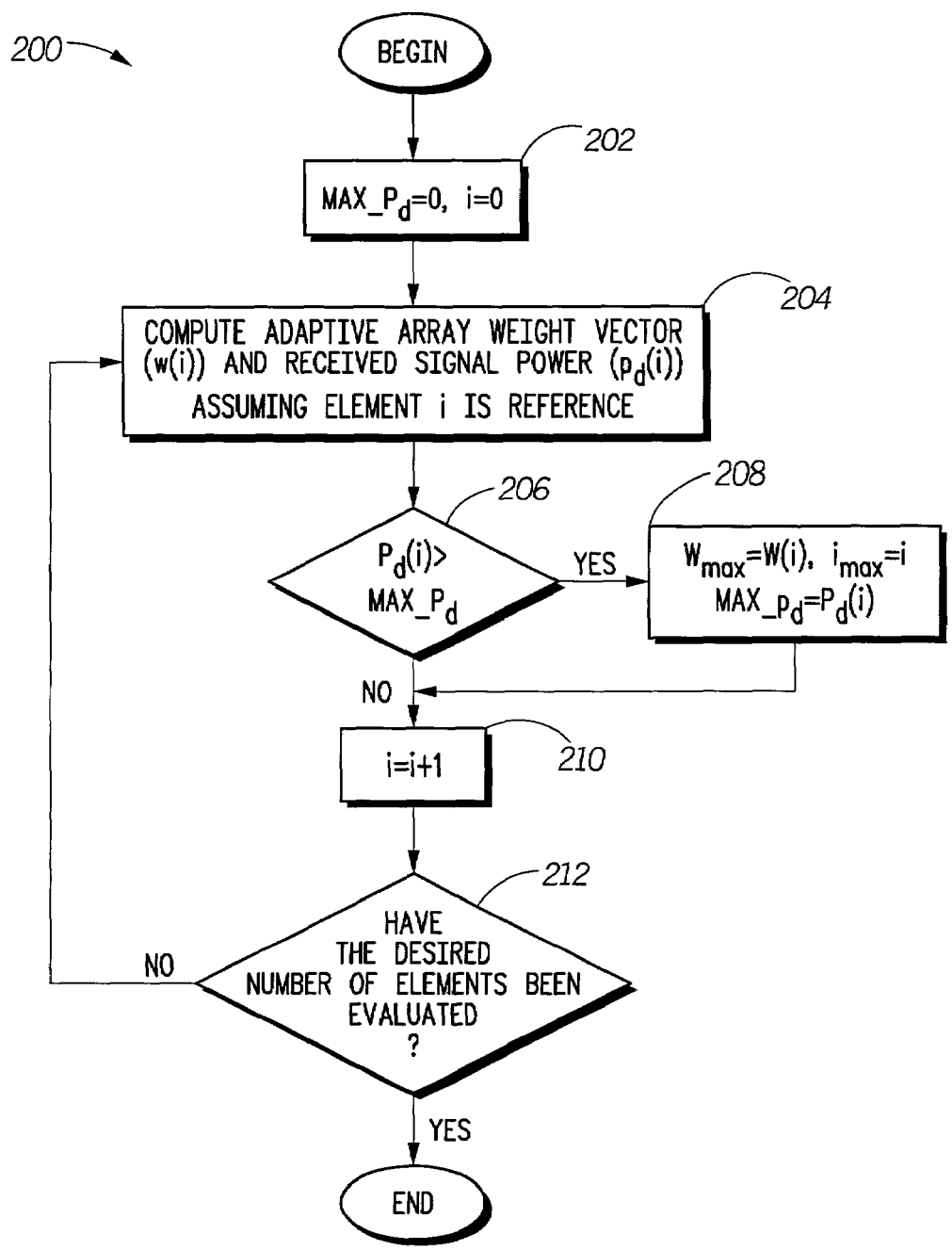
FIG. 2 is a method of selecting a reference antenna element according to a preferred exemplary embodiment of the present invention.

More specifically, and with reference to FIG. 2, a method of selecting a reference antenna element 200 is illustrated according to a preferred exemplary embodiment of the present invention. The method 200 begins with an initialization of a maximum traffic signal power (max_$p_d$) and an antenna element identifier (i) 202. After the initialization of the maximum traffic signal power (max_$p_d$) and antenna element identifier (i) 202 is completed, the adaptive array weight vector (w(i)) and the traffic signal power ($p_d$(i)) are computed with the $i^{th}$ antenna element as the reference antenna element 204. Preferably, these computations are conducted as previously described in this detailed description of a preferred exemplary embodiment.

The computations of the adaptive array weight vector (w(i)) and the traffic signal power ($p_d$(i)) are followed by a comparison of the traffic signal power ($p_d$(i)) computed with the $i^{th}$ antenna element as the reference antenna element and the current value of the maximum traffic signal power (max_$p_d$) 206. If the traffic signal power ($p_d$(i)) computed with the $i^{th}$ antenna element as the reference antenna element is greater than the current value of the maximum traffic signal power (max_$p_d$), the maximum antenna element values (i.e., $w_{max}$, $i_{max}$ and max_$p_d$) are updated with the values of the $i^{th}$ antenna element as the reference antenna element 208.

Once the maximum antenna element values are updated 208 or the traffic signal power ($p_d$(i)) computed with the $i^{th}$ antenna element as the reference antenna element is less than or equal to the current value of the maximum traffic signal power (max_$p_d$), the antenna element identifier (i) is incremented to identify another antenna element 210 and a query is made to determine if the desired number of antenna elements have been evaluated as the reference antenna element 212. As previously provided in this detailed description of a preferred exemplary embodiment, the evaluation is preferably for at least two antenna elements available as the reference element, more preferably for a majority of antenna elements that are available as the reference element, and most preferably for substantially all or all of the antenna elements that are available as the reference element. If the evaluations for the antenna elements as the reference antenna element have not been completed, the method 200 continues with the computation of the adaptive array weight vector (w(i)) and the traffic signal power ($p_d$(i)) with the $i^{th}$ antenna element as the reference antenna element 204. If the evaluation of each antenna element as the reference antenna element have been completed, the antenna element having values currently stored as the maximum antenna element values (i.e., $w_{max}$, $i_{max}$ and max_$p_d$) is selected as the reference antenna element 214, the method ends 216.

Referring to FIG. 1, after the adaptive array weight vector for the adaptive antenna array is computed that is at least a function of a reference channel impulse response of one of the antenna elements configured as the reference antenna element and a channel impulse response from at least one antenna element of the adaptive antenna array 104, information related to the identification of the antenna element selected as the reference antenna element to the subscriber unit is preferably communicated to the appropriate apparatus of the communication system 106 (e.g., the base transceiver transmits the identification of the antenna element selected as the reference antenna element if the base transceiver is selecting the reference antenna element). However, is should be understood that this step is optional based upon which apparatus or combination of apparatuses of the communication system is configured to compute the adaptive array weight vector and/or select the reference antenna element. The method 100 proceeds with the configuring of the adaptive antenna array with the adaptive array weight vector 108 and the traffic signal is transmitted with the adaptive antenna array such that the subscriber unit utilizes a pilot transmitted from the reference antenna element for demodulation of the traffic signal 110.

As can be appreciated and as previously provided in this detailed description of a preferred exemplary embodiment, the method 100 of FIG. 1 can be performed by an apparatus of the communication system other than base transceiver or by a combination of apparatuses of the communication system, including, but not limited to the subscriber unit. The subscriber unit can be configured to determine channel impulse responses from antenna elements associated with the base transceiver to the subscriber unit 102 and compute an adaptive array weight vector for the adaptive antenna array that is at least a function of a reference channel impulse response of one of the antenna elements configured as a reference antenna element and a channel impulse response from at least one antenna element of the adaptive antenna array 104 as previously described in this detailed description of a preferred exemplary embodiment. However, in order to minimize feedback requirements between the base transceiver and the subscriber unit, the subscriber unit is preferably configured to selecting an adaptive array weight vector (w) from a predefined number of adaptive array weight vectors stored in a codebook that is known by the subscriber unit and the base transceiver. Therefore, the adaptive array weight vector (w) is selected from the codebook for a particular antenna element configured as the reference element that maximizes the traffic signal power received by the subscriber unit ($p_d$). Although the traffic signal power received by the subscriber unit ($p_d$) is increased with the adaptive array weight vector (w) selected from the code book, this increase can be less than if the weights are not constrained to be in a code book, and the adaptive array weight vector (w) was not limited to the predefined set provided in the codebook. In addition, the traffic channel phase may be perturbed such that the phase correction factor (Δ) may not be unity.

In view of the non-unity phase correction factor when the array weight vector (w) is selected from the codebook, the subscriber unit preferably computes a phase correction, which is applied at the multi-path combiner output to correct the traffic channel phase. If the phase correction is applied to the traffic channel component of the received signal expressed in equation (1), the traffic channel phase component (d) of the received signal at the subscriber unit can be expressed as:

$$d=b\Delta v^H Hw = b(v^H Hw)^*/|v^H Hw| v^H Hw = b|v^H Hw| \qquad (9)$$

Since $|v^H Hw|$ is a real scalar, the phase of the received signal (b) is unperturbed, and coherent demodulation is available.

Figure 3:
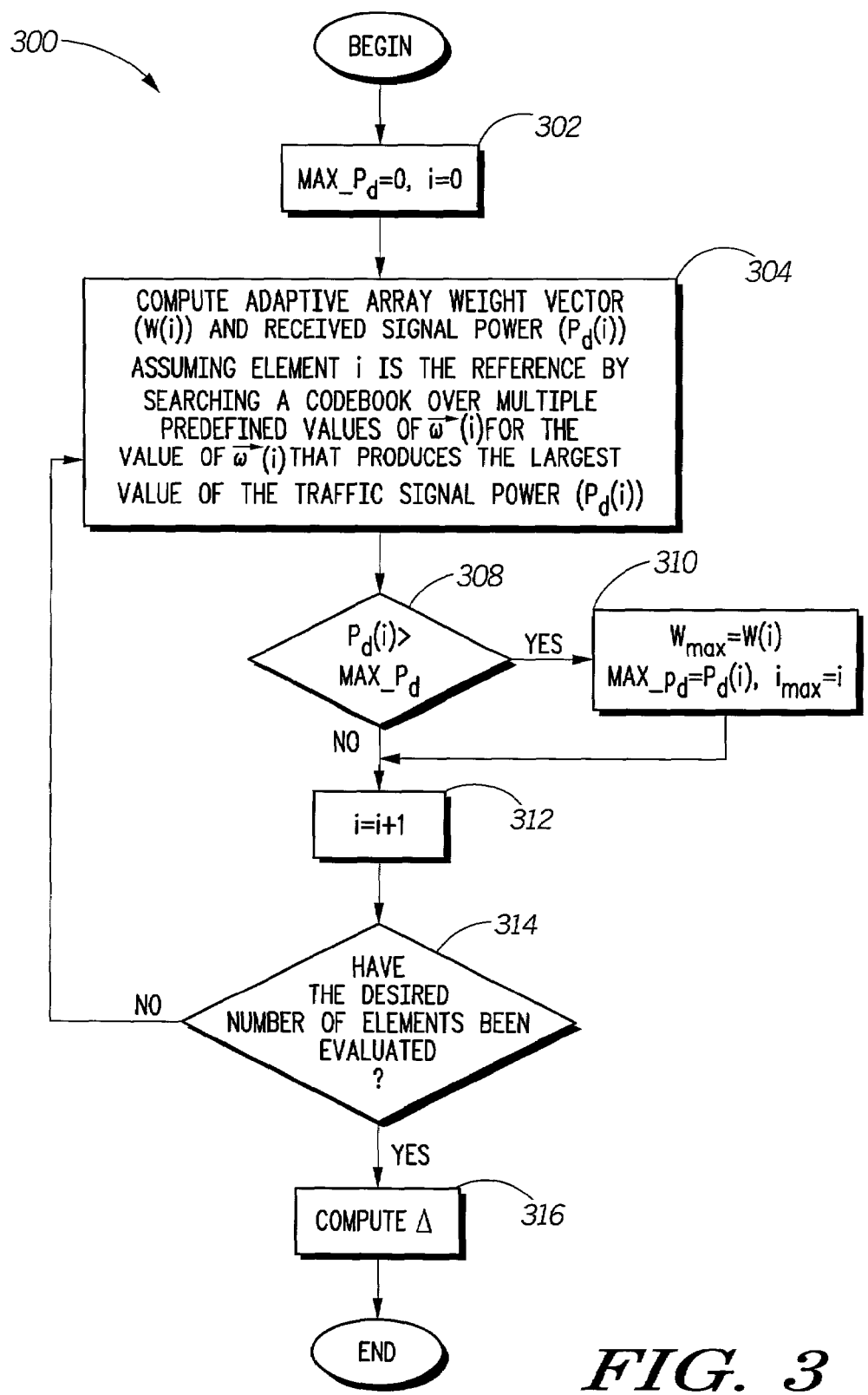
FIG. 3 is a method of selecting a reference antenna element that reduces feedback communications between the base transceiver and the subscriber unit according to a preferred exemplary embodiment of the present invention.

As previously discussed in this detailed description of a preferred exemplary embodiment, the traffic signal power received by the subscriber unit ($p_d$) can be increased for a given channel with the selection of a reference antenna element. However, as the subscriber unit is preferably configured to select the adaptive array weight vector from a codebook, the selection method of FIG. 3 is preferably performed to select the reference antenna element. Referring to FIG. 3, the method 300 begins with an initialization of a maximum traffic signal power (max_$p_d$) and an antenna element identifier (i) 302. After the initialization of the maximum traffic signal power (max_$p_d$) and antenna element identifier (i) 302 is completed, the adaptive array weight vector (w(i)) and the traffic signal power ($p_d$(i)) are computed with the $i^{th}$ antenna element as the reference antenna element 304.

The array weight vector (w(i)) and traffic signal power ($p_d$(i)) are computed by searching the codebook over multiple predefined values of the adaptive array weight vector (w) for the value of the adaptive array weight vector (w(i)) that produces the largest value of the traffic signal power ($p_d$(i)). Preferably, the computation of the traffic signal power ($p_d$(i)) is conducted as previously described in this detailed description of preferred exemplary embodiment. The computation of the adaptive array weight vector (w(i)) and the traffic signal power ($p_d$(i)) 304 is followed by a comparison of the traffic signal power ($p_d$(i)) computed with the $i^{th}$ antenna element as the reference antenna element and the current value of the maximum traffic signal power (max_$p_d$) 308. If the traffic signal power ($p_d$(i)) computed with the $i^{th}$ antenna element as the reference antenna element is greater than the current value of the maximum traffic signal power (max_$p_d$), the maximum antenna element values (i.e., $w_{max}$, $i_{max}$ and max_$p_d$) are updated with the values of the $i^{th}$ antenna element as the reference antenna element 310.

Once the maximum antenna element values are updated 310 or the traffic signal power ($p_d$(i)) computed with the $i^{th}$ antenna element as the reference antenna element is less than or equal to the current value of the maximum traffic signal power (max_$p_d$), the antenna element identifier (i) is incremented to identify another antenna element 312 and a query is made to determine if the desired number of antenna elements have been evaluated as the reference antenna element 314. As previously provided in this detailed description of a preferred exemplary embodiment, the evaluation is preferably for at least two antenna elements available as the reference element, more preferably for a majority of antenna elements that are available as the reference element, and most preferably for substantially all or all of the antenna elements that are available as the reference element. If the evaluations for the antenna elements as the reference antenna element have not been completed, the method 300 continues with the computation of the adaptive array weight vector (w(i)) and the traffic signal power ($p_d$(i)) with the $i^{th}$ antenna element as the reference antenna element 304. If the desired number of antenna elements has been evaluated as the reference antenna element, the phase correction factor is computed 316 as previously described in this detailed description of a preferred exemplary embodiment and the method 300 ends.

Referring to FIG. 1, after the adaptive array weight vector for the adaptive antenna array is computed that is at least a function of a reference channel impulse response of one of the antenna elements configured as the reference antenna element and a channel impulse response from at least one antenna element of the adaptive antenna array 104, information related to the identification of the reference antenna element is communicated to the appropriate apparatus of the communication system 106 (e.g., the subscriber unit transmits the identification of the antenna element selected as the reference antenna element and the adaptive array weight vector to the base transceiver). The method 100 proceeds with the configuring of the adaptive antenna array with the adaptive array weight vector 108 and the traffic signal is transmitted with the adaptive antenna array such that the subscriber unit utilizes a pilot transmitted from the reference antenna element for demodulation of the traffic signal 110.

As previously provided in this detailed description of a preferred exemplary embodiment, the foregoing methods can be performed by the base transceiver, which shall herein refer to a base receiver, base transmitter, or a combination base transmitter and a base receiver, subscriber unit, base transceiver and subscriber unit, or any other apparatus of the communication system individually or in conjunction with the base transceiver and/or the subscriber unit. Therefore, there are numerous apparatus configurations that can be utilized in accordance with the present invention and the following descriptions of a base transceiver and subscriber unit are presented only as examples and should not be construed to limit the scope of the apparatus of the invention as set forth in the appended claims.

Figure 4:
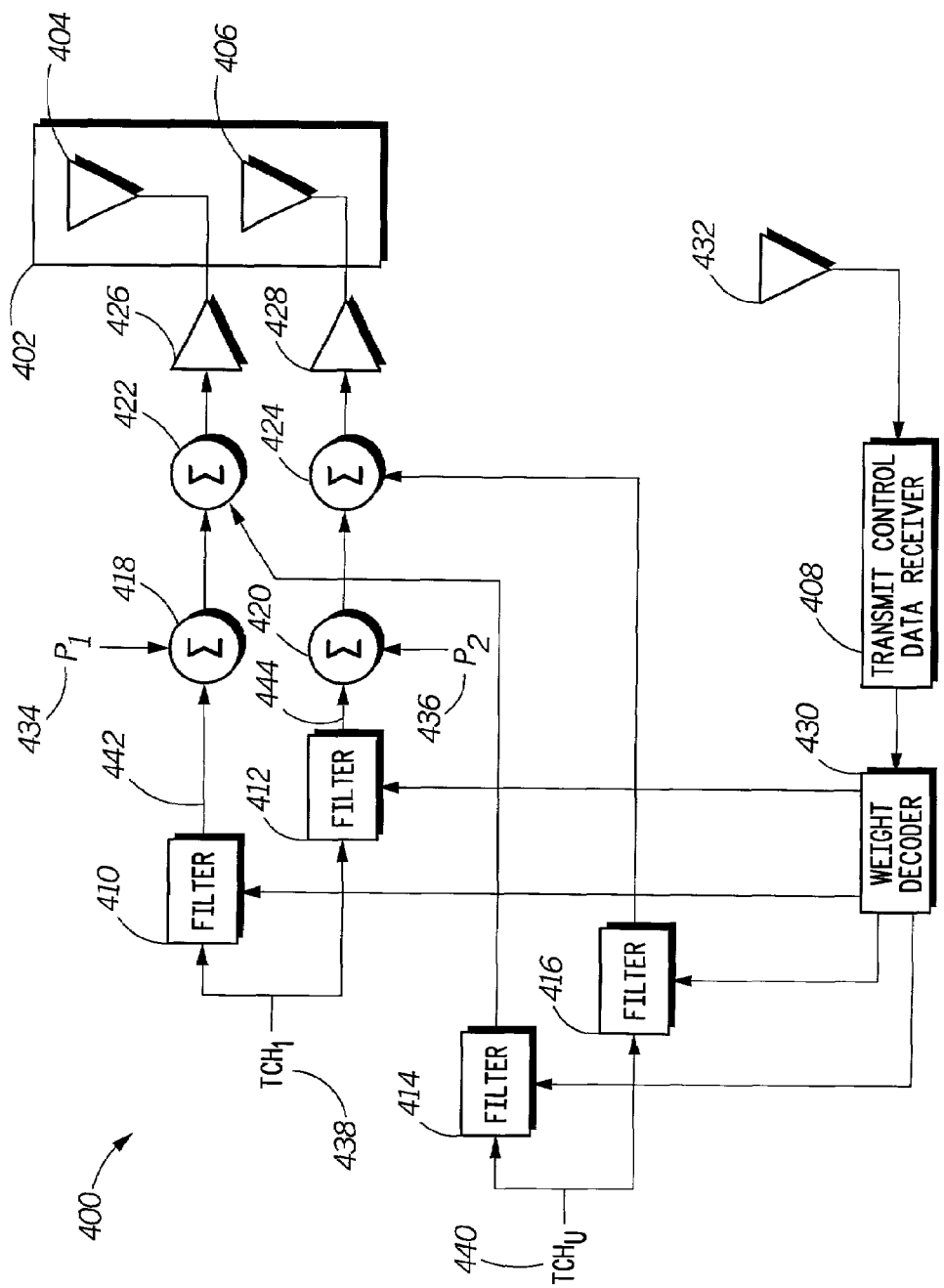
FIG. 4 is a base transceiver configured to perform the method of FIG. 1 in conjunction with a subscriber unit according to a preferred exemplary embodiment of the present invention.

Referring to FIG. 4, a base transceiver 400 is illustrated that is configured to perform the method of FIG. 1 according to a preferred exemplary embodiment of the present invention. The base transceiver 400 includes, but is not limited to, an antenna array 402 having a first antenna element 404 and second antenna element 406, a transmitter control data receiver 408, element filters (410,412,414,416), pilot summers (418,420), traffic signal summers (422,424), up-converters (426,428), weight decoder 430, and data receive antenna 432, which can be an element of the adaptive antenna array 402 or a separate antenna element from the adaptive antenna array 402. While only a first antenna element 404 and second antenna element 406 are presented in this exemplary description of the base transceiver 400, it should be understood that any number of elements could be used in the adaptive antenna array 402.

The base transceiver 400 is configured to emit a first element pilot ($P_1$) 434 and a second element pilot ($P_2$) 436 to a subscriber unit from the first antenna element 404 and the second antenna element 406, respectively. The first element pilot ($P_1$) 434 and second element pilot ($P_2$) 436 that are emitted by the first antenna element 404 and second antenna element 406 and received by the subscriber unit so that the subscriber unit is able to characterize the channel. The first element pilot ($P_1$) 434 and second element pilot ($P_2$) 436 also provide phase references for coherent demodulation, and can be used by the subscriber unit to determine a channel input response for the channels extending from the first antenna element 404 and second antenna element 406 to the subscriber unit.

The first element pilot ($P_1$) 434, second element pilot ($P_2$) 436, and any other element pilot emitted by the base transceiver or other apparatus of the communication system is preferably implemented with a direct-sequence spread spectrum signal and preferably constructed to have low cross correlation with other signals transmitted from the base transceiver 400. The element pilots of the base transceiver 400 may constructed from an orthogonal sequence, such as the Walsh-Hadamard sequences used in IS-95 or may be formed from other low cross correlation sequences, such as different offsets of a pseudonoise (PN) sequence, for example. (See TIA/EIA/IS-95-A, Mobile Station-Base Station Capability Standard for Dual Mode Wide Band Spread Spectrum Cellular System, March 1995, published by the Electronic Industries Association (EIA), 2001 I Street, N.W., Washington, D.C., 2000, for a description of the Walsh-Hadamard sequences, which is hereby incorporated by reference).

The channel impulse responses for the channels extending from the first antenna element 404 and second antenna element 406 to the subscriber unit may be determined using any number of techniques and devices, including a determination by a channel impulse response estimator, which will be subsequently described with reference to FIG. 6. The channel impulse responses are utilized by the subscriber unit to compute an adaptive array weight vector for the adaptive antenna array that is at least a function of a reference channel impulse response of one antenna element in operable communication with the base transceiver 400 (e.g., the first antenna element 404 or second antenna element 406) configured as reference antenna element and a channel impulse response from at least one of the antenna elements of the adaptive antenna array 402. The adaptive array weight vector computed by the subscriber unit and the identification of the reference antenna element is transmitted by the subscriber unit as transmitter control data that is quantized and received by the data receive antenna 432. However, the subscriber unit can be configured to transmit the channel impulse responses as the transmitter control data and the base transceiver 400 can be configured to compute the adaptive array weight vector. The transmitter control data received by receive data antenna 432 is provided to the transmit control data receiver 408. The transmit control data receiver 408 passes the preferably quantized transmitter control data to the weight decoder 430 for decoding of the array weight vector.

The base transceiver 400 is also configured to receive traffic channel signals for multiple users (i.e., $Tch_1$ 438 through $TCH_U$ 440), where U is the number of users) and split each of the traffic channel signal N-ways, which are provided to the N element filters (410,412,414,416) associated with a traffic channel signal (i.e., $Tch_1$ 438 through $TCH_U$ 440, which receive their filter coefficients from weight decoder 430. The outputs of the element filters (410,412) are summed with the element pilots (434,436) by the pilot summers (418,420), summed with the other traffic channel signals by the traffic signal summers (422,424), upconverted with upconverters (426,428), and transmitted from the antenna of the adaptive antenna array 402 (e.g., the first antenna element 404 or second antenna element 406 of the adaptive antenna array 402).

The element filters (410,412,414,416) are preferably digital filters whose coefficients are the values of the adaptive array weight vector that are calculated as previously described in this detailed description of a preferred exemplary embodiment. If the adaptive array weight vector is not frequency selective, the element filters (410,412,414,416) are each composed of a single complex number. If the adaptive array weight vector is frequency selective, the adaptive array weight vectors contain more than one complex number. The element filters (410,412,414,416) can be implemented with any number of filters including conventional digital filters as described by Crochiere & Rabiner, "Multirate Digital Signal Processing," Prentice-Hall, 1983, which is hereby incorporated by reference.

Figure 5:
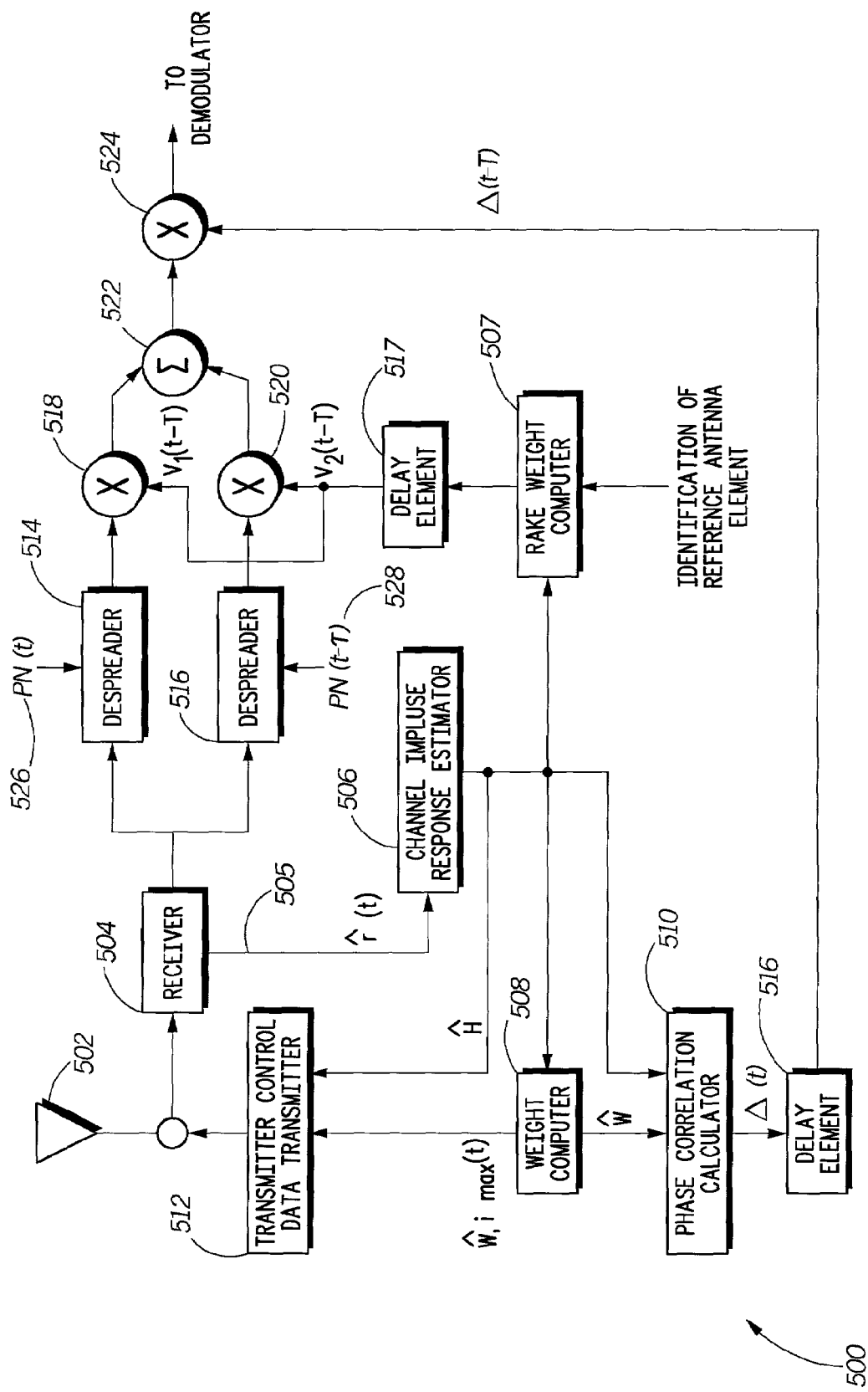
FIG. 5 is a subscriber unit configured to perform the method of FIG. 1 in conjunction with the base transceiver of FIG. 4 according to a preferred exemplary embodiment of the present invention.

Referring to FIG. 5, a subscriber unit 500 is illustrated that is configured to perform the method of FIG. 1 according to a preferred exemplary embodiment of the present invention. The subscriber unit 500 includes, but is not limited to an antenna 502, a receiver 504, a channel impulse response estimator 506, a weight calculator 508, RAKE weight computer 507, a phase correction calculator 510; a control data transmitter 512; despreaders (514,516), multipliers (518, 520); channel summer 522 and multiplier 524. The antenna 502 of the subscriber unit 500 is configured to receive and transmit signals to and from the base transceiver. The antenna 502 is coupled to the receiver 504, which converts the RF signal from the antenna, providing the baseband signal 505 to the channel impulse response estimator 506 for determination of the channel impulse responses extending from the antenna elements of the antenna array to the subscriber unit 500.

Figure 6:
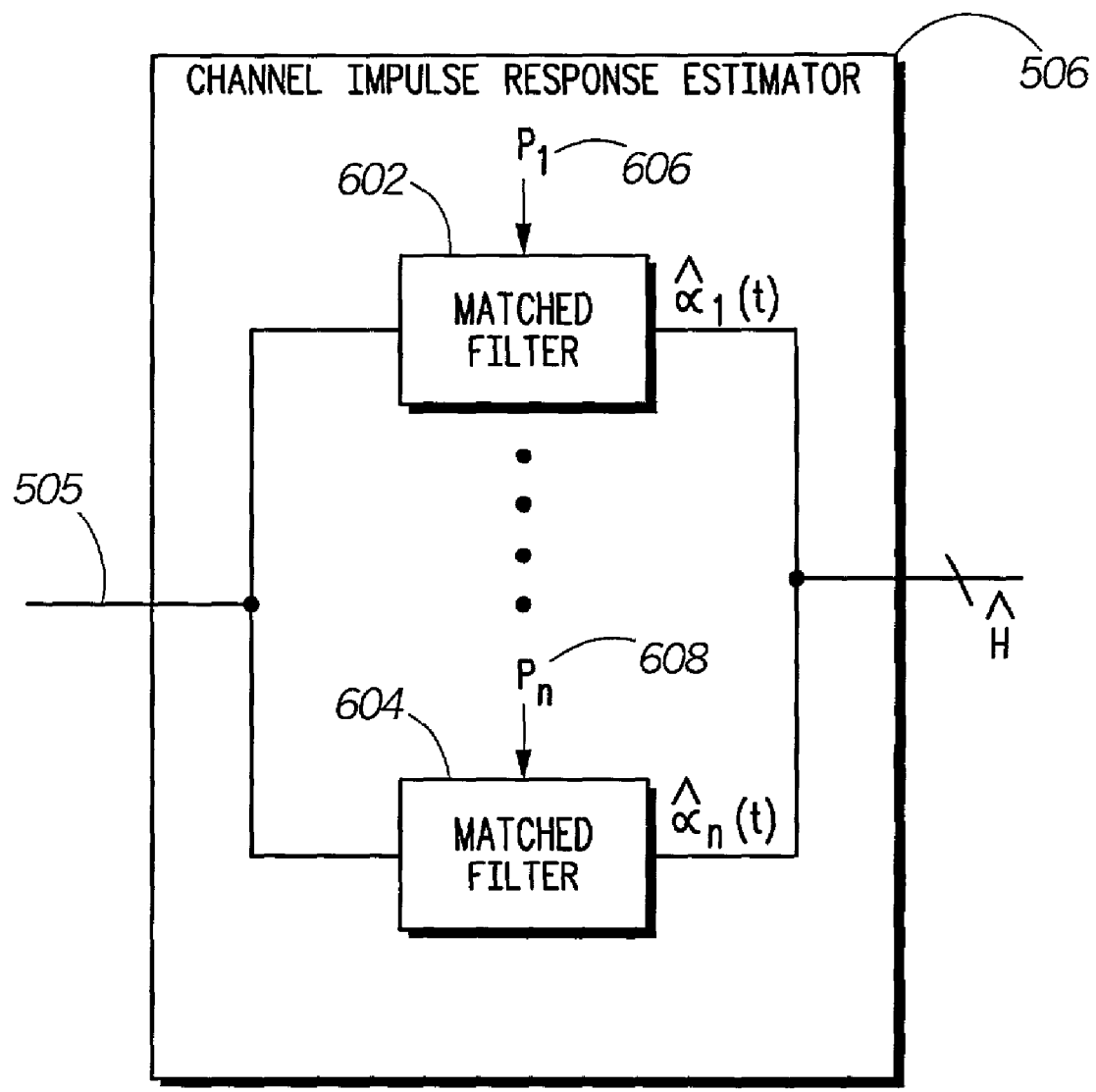
FIG. 6 is the channel impulse response estimator of FIG. 5 shown in greater detail according to a preferred exemplary embodiment of the present invention.

Referring to FIG. 6, the channel impulse response estimator 506 is shown in greater detail. The channel impulse response estimator 506 is configured to determine the channel impulse responses for channels existing between the base transceiver and the subscriber unit. The channel impulse response estimator 506 receives the down converted baseband signal (r(t)) 505, which is provided to matched filters (602,604) that also receive pilot inputs (606,608) corresponding to the element pilots emitted by the antenna elements associated with the base transceiver. The matched filters (602,604) convolve the baseband signal (r(t)) 505 with the time reversed complex conjugate of the element pilots, produce the channel input responses (H). The length of the matched filters (602,604) is preferably selected to be long enough to average out noise, but short enough so the matched filters (602,604) are responsive to changes in the channel. These channel impulse responses (H) produced by the matched filters (602,604) are presented to a transmitter control data transmitter of the subscriber unit.

Referring to FIG. 5, in addition to the transmitter control data transmitter 512, the vector representations of the channel impulse responses (H) produced by the channel impulse response estimator 506 are also provided to the weight calculator 508 and the phase correction calculator 510. The weight calculator 508 computes the array weight vector (w) from the channel impulse responses as previously discussed in this detailed description of a preferred exemplary embodiment. For each time instant (t), the array weights vector (w) and the selected reference antenna element identified during the computation of the array weight vector ($i_{max}(t)$) are provided to transmit control data transmitter 512 for transmission to the base transceiver.

The array weight vector (w) is also provided to the phase correction calculator 510, which also receives the channel impulse responses from the channel impulse response estimator 506. The phase correction calculator 510 calculates the phase correction factor ($\Delta(t)$) to correct for residual phase error that is not corrected with the utilization of the array weight vector (w) at the each time instant (t). The phase correction factor ($\Delta(t)$) is provided to a delay element 516 in order to provide a delay that is sufficient to allow implementation of the array weight vector (w) by the base transceiver (i.e., the delay ensures that the base transceiver is using the array weight vector (w) for which the phase correction factor $\Delta(t)$ was computed by the phase correction calculator 512. The delayed phase correction factor $\Delta(t-T)$ produced by the delay element 516 is used by the multiplier 524, the output of which is a phase corrected signal suitable for demodulation and decoding by conventional methods.

Once the base transceiver is transmitting with adaptive array weight vector (w) for the delayed phase correction $\Delta(t-T)$, the subscriber unit 500 is configured to coherently demodulate the transmitted traffic signal. More specifically, the output of receiver 504 is despread by despreaders (514,516), which correlate with a despreading sequence (PN(t)) 526 and a delayed copy of the PN sequence (PN (t−τ)) 528. The outputs of the despreaders (514,516) are provided to the multipliers (518,520), which multiply the outputs by combining weights ($v_1$, $v_2$) produced by the RAKE weight computer 507.

The RAKE weight computer 507 computes the combining weights ($v_1$, $v_2$) using any number of suitable techniques. For example, and as previously discussed in conjunction with the equation (2), a common technique that can be used to compute the combining weights ($v_1$, $v_2$) is the maximum ratio combining technique, which sets the combining weights ($v_1$, $v_2$) to the complex conjugate of the channel responses that are weighted by the noise power. When the reference antenna element is an element of the antenna array, equation (2) can be expressed as:

$$v_j = H^*_{j,imax}/\sigma_j^2 \quad (10)$$

Where $v_j$ is the RAKE combining weight for a delay (j), $H^*_{j,imax}$ is the complex conjugate of the element of the channel impulse response matrix (H) at row j and column $i_{max}$, and $\sigma_j^2$ is the noise power on the output of the despreader matched to delay (j).

In order to determine the combining weights in accordance with equation (10), the RAKE weight computer 507 is provided with the identification of the antenna element that is selected as the reference antenna element when adaptive array weight vector (w) is applied at the base transceiver. Therefore, the output of the RAKE weight computer 507 is provided to a second delay element 517. This means that the antenna element selected as the reference antenna element that is computed at a time (t) ($i_{max}(t)$) is delayed by a delay time (T) as previously discussed with reference to the delay of the phase correction factor. The outputs of the despreaders (514,516) and the delayed combining weights are multiplied by the multipliers (518,520), the outputs of the multipliers (518,520) are summed by the summer 522, and the multiplier 524 performs the phase correction with a multiplication of the output of the summer 522 and the delayed phase correction factor. The output of the summer 522 is provided to a demodulator (not shown) for subsequent processing.

From the foregoing description, it should be appreciated that the foregoing method and apparatus of the present invention provides methods and apparatus for transmitting a traffic channel with an adaptive antenna array without per-user pilots. In addition, the methods and apparatus of the present invention provide traffic signals intended for a subscriber unit in higher-gain antenna lobes pointed in the direction of the subscriber unit and nulls in the antenna pattern that are likely directed to other subscriber units without the need for per-user pilots, high-capacity, and complex signaling between the base transceiver and the subscriber unit. In addition, the foregoing detailed description of a preferred exemplary embodiment is not intended to be exhaustive or to limit the invention. Rather, the foregoing detailed description of a preferred exemplary embodiment is intended to enable one of ordinary skill in the art to utilize the invention in various embodiments and with various modifications, with such modifications and variations within the scope of the invention as set forth in the appended claims.

What is claimed is:

1. A method of transmitting a traffic signal with an adaptive antenna array of a base transceiver, such that a subscriber unit utilizes a non-dedicated pilot transmitted from a reference antenna element for demodulation of the traffic signal, comprising:

determining a channel impulse response from a plurality of antenna elements in operative communication with the base transceiver to a receive antenna of the subscriber unit;

computing an array weight vector that is at least a function of a reference channel impulse response of one of said plurality of antenna elements configured as the reference antenna element and said channel impulse response of one of said plurality of antenna elements that is an element of the adaptive antenna array; and transmitting the traffic signal with the adaptive antenna array configured with said adaptive array weight vector.

2. The method of claim 1, wherein determining said channel impulse response from said plurality of antenna elements comprises determining a channel impulse response from an antenna element of the adaptive antenna array.

3. The method of claim 1, wherein determining said channel impulse response from said plurality of antenna elements comprises determining a channel impulse response from more than one antenna element of the adaptive antenna array.

4. The method of claim 1, wherein computing said array weight vector accounts for a Signal to Interference plus Noise Ratio (SINR) and enables the subscriber unit to use said reference channel impulse response emitted from said reference antenna element as a demodulation reference.

5. The method of claim 1, wherein said function comprises the traffic signal power received by the subscriber unit ($p_d$).

6. The method of claim 5, wherein said function comprising said traffic signal power received by the subscriber unit ($p_d$) is:

$$p_d = |v^H H w|^2$$

where $v^H$ is the complex conjugate transpose of the multi-pat combining weights (v), H is a matrix with M rows and N columns containing the channel impulse response for a channel between an element of the adaptive antenna array and the subscriber unit, w is said adaptive array weight vector; and $|x|^2$ is the absolute value squared of the variable x.

7. The method of claim 6, wherein said adaptive array weight vector (w) is selected to satisfy the following:

$$w = H^H v / \|H^H v\|_2$$

where $\|x\|_2$ is the 2-norm of a vector x.

8. The method of claim 6, wherein said function further comprising a phase correction factor ($\Delta$) is:

$$\Delta = (v^H H w)^* / |v^H H w|.$$

9. The method of claim 6, wherein said multipath combining weights (v) are computed using:

$$v = \Sigma^{-1} h$$

where $\Sigma^{-1}$ is a matrix with M rows and M columns representing the inverse of a noise autocorrelation matrix.

10. The method of claim 5, wherein said function further comprises a phase correction factor ($\Delta$).

11. The method of claim 10, further comprising applying said phase correction factor ($\Delta$) to the traffic signal received by the subscriber unit.

12. The method of claim 11, wherein applying said phase correction factor ($\Delta$) is delayed to account for feedback of said phase correction factor ($\Delta$) from the subscriber unit to the base transceiver.

13. The method of claim 1, wherein computing an array weight vector comprises selecting said reference antenna element.

14. The method of claim 13, wherein said selecting said reference antenna element comprises:
   computing a first traffic signal power for a first antenna element configured as said reference antenna element;
   computing second traffic signal power for a second antenna element as said reference antenna element;
   comparing said first traffic signal power and said second traffic signal power; and
   selecting said first antenna element as said reference antenna element if said first traffic signal power is greater than said second traffic signal power.

15. The method of claim 14, wherein said first traffic signal power is computed with a first array weight vector identified from a codebook and said second traffic signal power is computed with a second array weight vector identified from said codebook.

16. The method of claim 1, further comprising transmitting an identification of said reference antenna element to the subscriber unit.

17. The method of claim 1, further comprising transmitting an identification of said reference antenna element to the base transceiver.

18. An apparatus for transmitting a traffic signal with an adaptive antenna array of a base transceiver such tat a subscriber unit utilizes a non-dedicated pilot transmitted from a reference antenna element for demodulation of the traffic signal, comprising:
   a channel impulse response estimator configured to determine a channel impulse response from a plurality of antenna elements in operative communication with the base transceiver to a receive antenna of the subscriber unit;
   an array weight calculator configured to compute an array weight vector that is at least a function of a reference channel impulse response of one of said plurality of antenna elements configured as a reference antenna element and said channel impulse response of one of said plurality of antenna elements that is an element of the adaptive antenna array;
   a weight decoder configured to configure the adaptive antenna array with said adaptive array weight vector.

19. The apparatus of claim 18, wherein said channel impulse response estimator is configured to determine a channel impulse response from an antenna element of the adaptive antenna array.

20. The apparatus of claim 18, wherein said channel impulse response estimator is configured to determine a channel impulse response from more than one antenna element of the adaptive antenna array.

21. The apparatus of claim 18, wherein said array weight calculator accounts for a Signal to Interference plus Noise Ratio (SINR) and enables the subscriber unit to use said reference channel impulse response emitted from said reference antenna element as a demodulation reference.

22. The apparatus of claim 18, wherein said function comprises the traffic signal power received by the subscriber unit ($p_d$).

23. The apparatus of claim 22, wherein said function comprising said traffic signal power received by the subscriber unit ($p_d$) is:

$$p_d = |v^H H w|^2$$

where $v^H$ is the complex conjugate transpose of the multi-path combining weights (v), H is a matrix with M rows and N columns containing the channel impulse response for a channel between an element of the adaptive antenna array and the subscriber unit, w is said adaptive array weight vector, and $|x|^2$ is the absolute value squared of the variable x.

24. The apparatus of claim 23, wherein said adaptive array weight vector (w) is selected to satisfy the following:

$$w = H^H v / \|H^H v\|_2$$

where $\|x\|_2$ is the 2-norm of a vector x.

25. The apparatus of claim 23, wherein said multi-path combining weights (v) are computed using:

$$v = \Sigma^{-1} h$$

where $\Sigma^{-1}$ is a matrix with M rows and M columns representing the inverse of a noise autocorrelation matrix.

26. The apparatus of claim 22, wherein said function further comprises a phase correction factor ($\Delta$).

27. The apparatus of claim 26, wherein said phase correction factor ($\Delta$) is:

$$\Delta = (v^H H w)^* / |v^H H w|$$

where $v^H$ is the complex conjugate transpose of the multi-path combining weights (v), H is the matrix with M rows and N columns containing the channel impulse response for the channel between an element of the adaptive antenna array and the subscriber unit w is the adaptive array weight vector $|x|^2$ is the absolute value scared of the variable x.

28. The apparatus of claim 26, further comprising a multiplier configured to apply said phase correction factor ($\Delta$) to the traffic signal received by the subscriber unit.

29. The apparatus of claim 28, further comprising a delay element configured to receive said phase correction factor ($\Delta$) and produce a delayed phase correction factor ($\Delta(t-T)$) to account fur feedback of said phase correction factor ($\Delta$) from the subscriber unit to the base transceiver.

30. The apparatus of claim 18, wherein said array weight calculator is configured to select said reference antenna element.

31. The apparatus of claim 18, wherein said array weight calculator is configured to:

compute a first traffic signal power for a first antenna element configured as said reference antenna element;

compute second traffic signal power for a second antenna element as said reference antenna element;

compare said first traffic signal power and said second traffic signal power; and select said first antenna element as said reference antenna element if said first traffic signal power is greater than said second traffic signal power.

32. The apparatus of claim 31, wherein said first traffic signal power is computed with a first array weight vector identified from a codebook and said second traffic signal power is computed with a second array weight vector identified from said codebook.

* * * * *